(12) United States Patent
Ronald et al.

(10) Patent No.: US 6,886,641 B2
(45) Date of Patent: May 3, 2005

(54) AGRICULTURAL APPARATUS

(75) Inventors: David Cameron Ronald, Quirindi (AU); Christopher Henry Holland, Spring Ridge (AU); David Peter Brownhill, Spring Ridge (AU)

(73) Assignee: Bitza Research PTY LTD, Quirindi (AU)

( * ) Notice: Subject to any disclaimer, the term of this patent is extended or adjusted under 35 U.S.C. 154(b) by 0 days.

(21) Appl. No.: 10/362,100

(22) PCT Filed: Aug. 21, 2001

(86) PCT No.: PCT/AU01/01035

§ 371 (c)(1),
(2), (4) Date: May 20, 2003

(87) PCT Pub. No.: WO02/15665

PCT Pub. Date: Feb. 28, 2002

(65) Prior Publication Data

US 2004/0149458 A1 Aug. 5, 2004

(30) Foreign Application Priority Data

Aug. 21, 2000 (AU) .............................................. PQ9560

(51) Int. Cl.$^7$ ................................................. A01C 5/06
(52) U.S. Cl. ......................... 172/134; 172/536; 111/163
(58) Field of Search ................................. 172/133, 536, 172/613, 13, 135, 134; 111/163, 164, 165, 166, 167, 168, 169

(56) References Cited

U.S. PATENT DOCUMENTS

| | | | |
|---|---|---|---|
| 4,445,314 A | | 5/1984 | Gust ............................ 56/126 |
| 4,473,016 A | | 9/1984 | Gust ............................ 111/86 |
| 4,519,460 A | | 5/1985 | Gust ............................ 172/176 |
| 4,611,545 A | | 9/1986 | Nickeson et al. ............. 111/52 |
| 5,398,625 A | * | 3/1995 | Johnson et al. ............. 111/189 |
| 5,435,399 A | | 7/1995 | Peterson et al. ............... 175/20 |
| 5,481,990 A | | 1/1996 | Zacharias .................... 111/174 |
| 5,595,130 A | * | 1/1997 | Baugher et al. .............. 111/52 |
| 5,619,939 A | * | 4/1997 | Herman et al. ............. 111/163 |
| 5,802,995 A | | 9/1998 | Baugher et al. .............. 111/52 |
| 5,887,664 A | | 3/1999 | Whalen et al. ............. 172/430 |
| 6,347,594 B1 | * | 2/2002 | Wendling et al. ........... 111/167 |
| 6,578,502 B1 | * | 6/2003 | Barnstable et al. ......... 111/164 |

FOREIGN PATENT DOCUMENTS

| | | | |
|---|---|---|---|
| AU | 290912 | 12/1965 | |
| AU | 19352/83 | 3/1983 | |
| AU | 19353/83 | 3/1984 | |
| AU | 37911/85 | 6/1985 | |
| AU | 48951/85 | 10/1985 | |
| DE | 29 25 838 | 1/1981 | |
| FR | 2 415 420 | 8/1979 | |
| GB | 2 059 733 | 4/1981 | |
| WO | WO 200016605 A | * 3/2000 | ............ A01C/5/06 |

OTHER PUBLICATIONS

"Drills, Seeders And Seeding Tiller", *John Deere* brochure.
"Superseeders", *John Deere* brochure.
"2000 Series Planters", *Kinze* brochure, Jan. 1995 (Rev. Aug. 1996), Williamsburg, Iowa.
"Seeding Today", Seeding Innovations and Technology, Dec. 1997, Flexi–Coil, Toowoomba, Australia.

* cited by examiner

*Primary Examiner*—Robert E. Pezzuto
*Assistant Examiner*—Alexandra K. Pechhold
(74) *Attorney, Agent, or Firm*—Steptoe & Johnson LLP; D. Douglas Price

(57) ABSTRACT

A furrow forming tool (20) for use in agricultural apparatus, the tool (20) including a furrow forming disc (27) and a ground engaging wheel (28) associated therewith, the disc (27) and its associated ground engaging wheel (28) being assembled another with respect to the normal direction of travel of the tool (20) when in use, the disc (27) being mounted relative to the tool (20) so that its leading edge (29) is disposed forwardly of the leading edge of the ground engaging wheel (28).

9 Claims, 6 Drawing Sheets

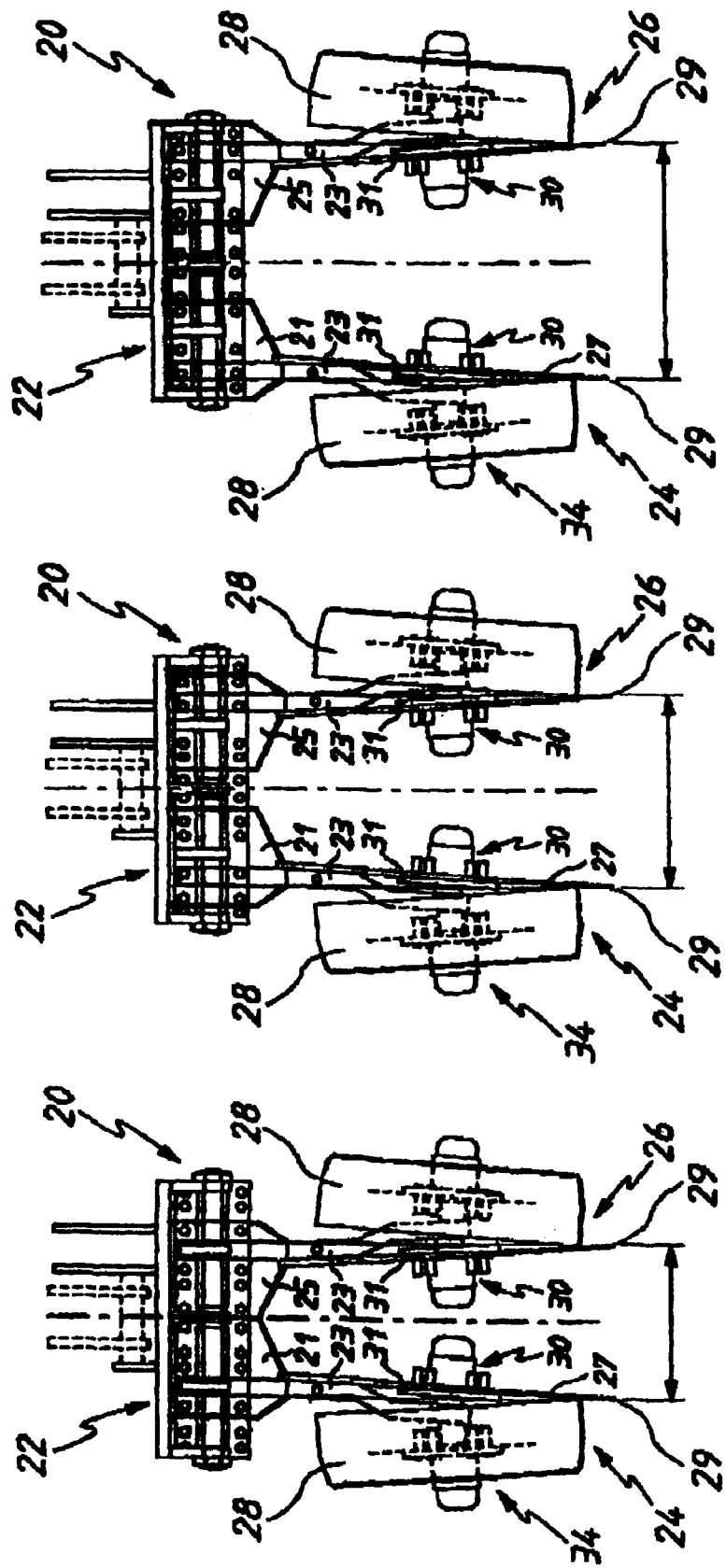

AGRICULTURAL APPARATUS

This invention relates generally to agricultural apparatus, and more particularly to apparatus suitable for use in a system whereby seed can be planted, fertiliser dispensed and the ground subsequently compacted in one pass over the ground.

Apparatus of the aforementioned type has in recent years gained considerable acceptance. The apparatus currently in use does however suffer from some drawbacks. For example, control of the depth of the furrow to be produced can be difficult. In addition, the furrow forming tool under some circumstances can become clogged with stubble or trash residue depending on the type of conditions the apparatus is being used in. This can lead to the stubble or trash residue having to be continually cleaned from the tool. Furthermore, currently known apparatus usually comprise a relatively large number of components.

It is an object of the present invention to provide an improved agricultural apparatus and components therefor which alleviates one or more of the aforementioned drawbacks.

According to one aspect of the present invention there is provided a furrow forming tool for use in agricultural apparatus the tool including a tool frame, a furrow forming disc operatively mounted to the tool frame, the disc including a peripheral edge and opposed side faces, the disc being operatively mounted to the tool frame such that when in use the disc is disposed in a plane which is inclined with respect to the normal direction of travel of the tool such that one side face is facing generally forwardly and the other side face is facing generally rearwardly with respect to the direction of travel, the tool further including a ground engaging wheel associated therewith, the disc and its associated ground engaging wheel being assembled together so that they converge towards one another with respect to the normal direction of travel of the tool when in use, the disc being mounted relative to the wheel so that its leading edge is disposed forwardly of the leading edge of the ground engaging wheel with the ground engaging wheel disposed adjacent to the rearwardly facing side face of the disc.

In a preferred embodiment of this aspect of the invention the tool is operatively mounted to a tool frame which is adapted to be mounted to a main frame of the apparatus when in use. The tool frame may include a disc mounting member and a wheel mounting member each operatively connected to the tool frame.

Preferably, the wheel mounting member includes a support plate pivotally mounted to the tool frame for pivotal movement relative thereto. The wheel is preferably mounted to the plate at a mounting section which may be in the form of a stub axle which is spaced from the pivot mounting. The arrangement is such that pivotal movement of the plate causes relative displacement between the wheel and its associated disc. The plate preferably forms part of an adjustment assembly which may further include an adjustment link and a link mounting the link extending between the plate and the link mounting. Preferably, the link mounting includes a plurality of mounting positions for selectively holding the link so that the position of the wheel relative to the disc can be held in a selected position.

According to another aspect of the present invention there is provided a furrow forming tool for use in agricultural apparatus, the tool including a furrow forming disc and an associated ground engaging wheel and means for adjusting the position of the disc relative to the wheel so that the depth of the furrow being formed by the disc can be selectively controlled.

According to yet another aspect of the present invention there is provided a furrow forming tool unit for use in agricultural apparatus, the tool unit including a tool frame which is adapted to support two or more furrow forming tools of the type described above in spaced apart relation relative to one another. The tool unit is arranged on the agricultural apparatus so that a furrow filling tool is disposed rearwardly and between adjacent tools on the unit so that it is adapted to fill both furrows.

The agricultural apparatus includes a main frame to which the furrow forming tools are operatively connected and may further include compacting means arranged to compact the ground after the furrow has been filled.

The furrow forming tool may include a tool support frame which is operatively connected to the main frame of the apparatus and may include a support arm, a disc mounting member and wheel mounting member each operatively connected to the support arm, the wheel mounting member being mounted for pivotal movement relative thereto so that the pivotal movement will cause movement of the wheel mounting member relative to the disc mounting member.

Preferably, the adjustment mechanism includes an adjustment link operatively connected to the wheel mounting member and operatively connected to a link mounting having a series of link mounting positions thereon.

In order to enable a clearer understanding of the invention, drawings illustrating example embodiments are attached, and in those drawings:

FIGS. 2A, 2B and 2C are details of components of the adjustment mechanism shown in FIG. 2;

Figure 3:
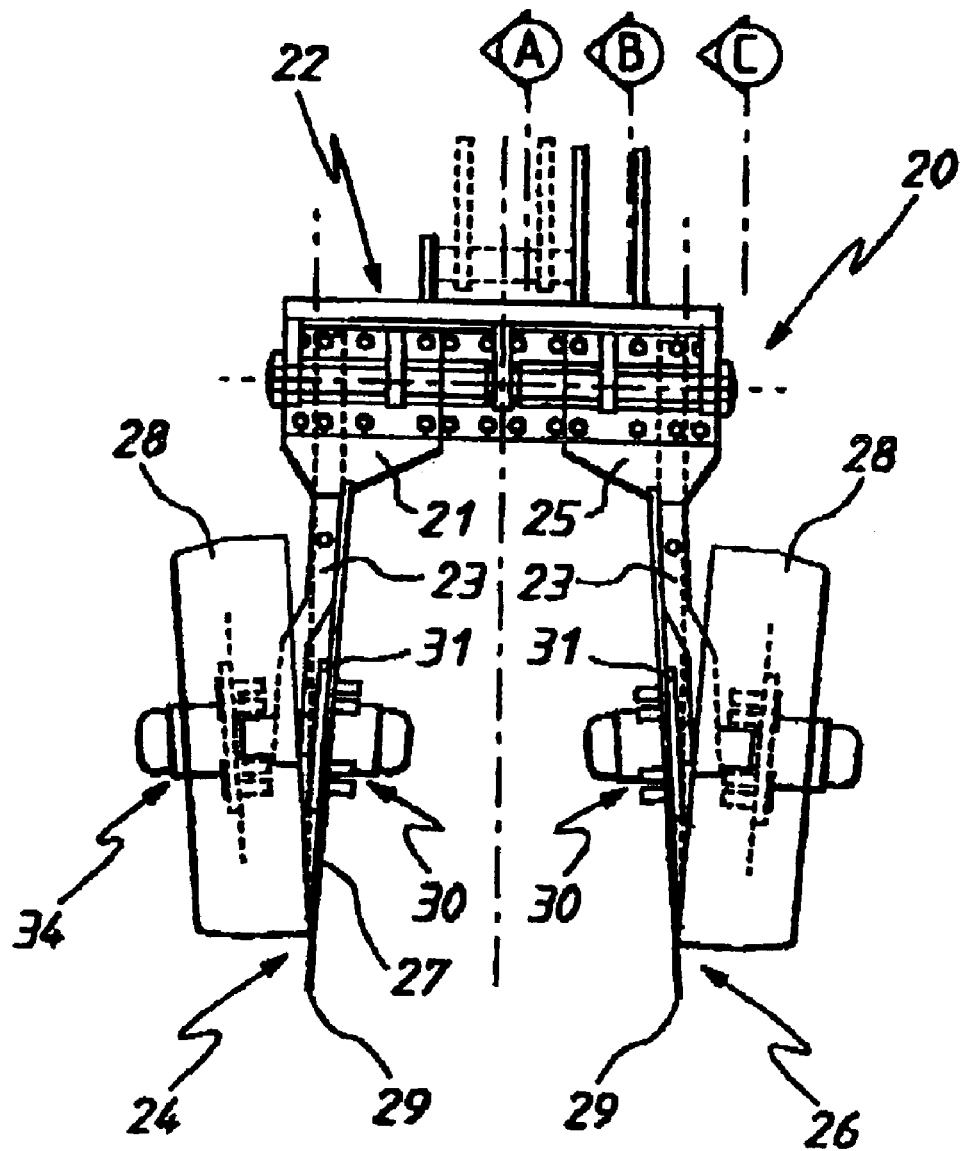
FIG. 3 is a plan view of the tool unit according to a preferred embodiment of the present invention.
Figure 4:
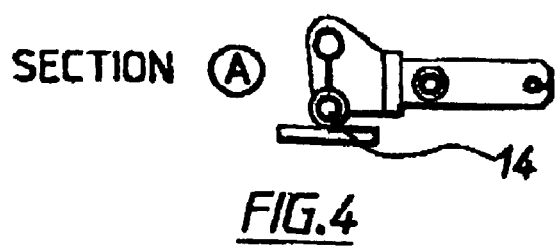
Figure 5:
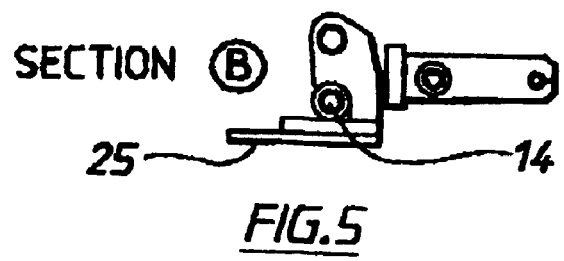
Figure 6:
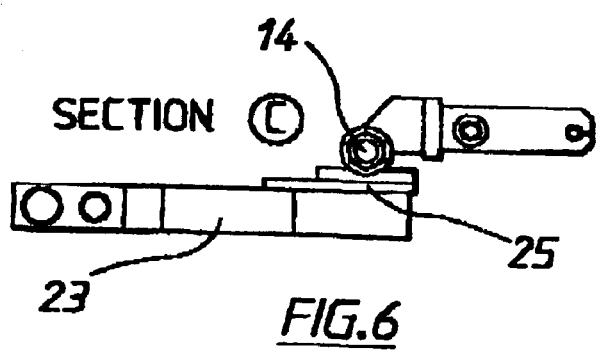
Figure 7:
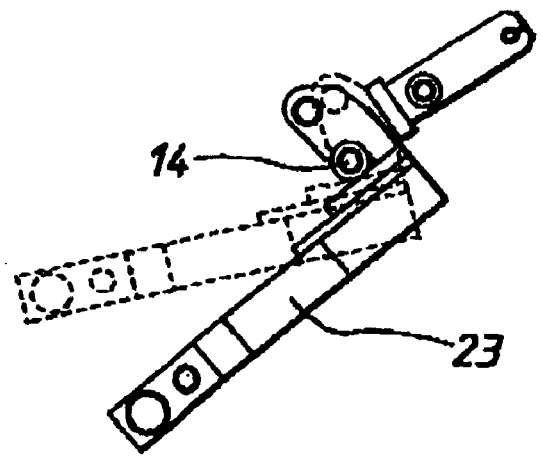
Figure 11:
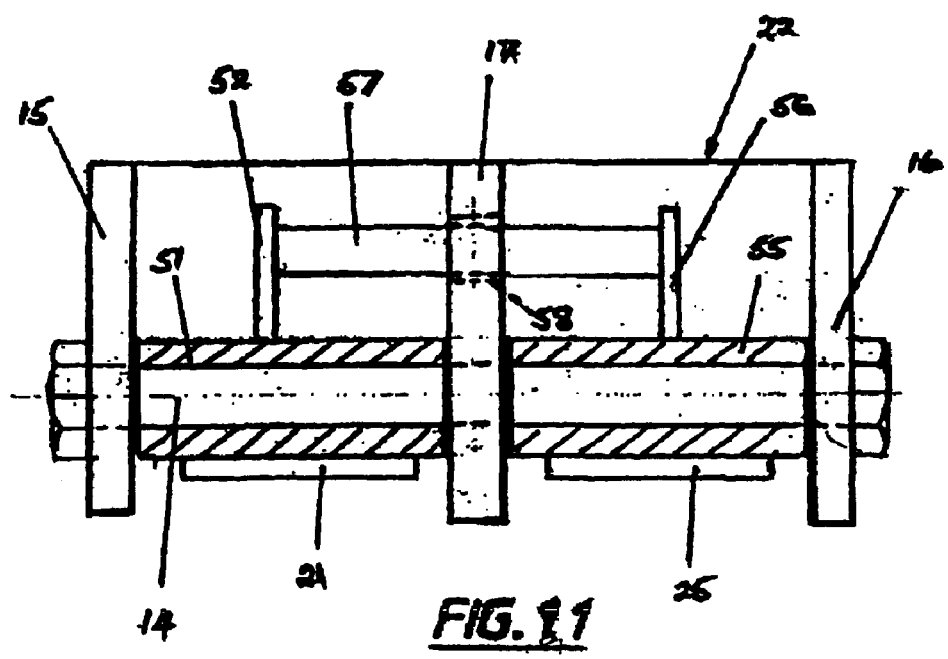

FIGS. 4, 5, and 6 are sectional views taken along the lines C, B and A in FIG. 3;

FIG. 7 is a side elevation of part of the tool mounting frame;

FIGS. 8, 9 and 10 are similar views to that shown in FIG. 3 showing how the spacing between the tools on a tool unit can be changed; and FIG. 11 is a schematic front elevation view partly in section illustrating how the arms can be mounted to the tool flame.

Referring to the drawings, there is shown an agricultural apparatus 10 having a main frame 12 which is adapted to be connected a vehicle such as a tractor for movement over the ground in the direction indicated by arrow A.

The apparatus 10 includes a furrow forming tool unit 20 which includes a tool frame 22 having a pair of tool support arms 23, each carrying respective tools 24 and 26 thereon.

The tool frame includes mounting plates 21 and 25 at the ends of respective tool support arms 23. The mounting plates 21 and 25 are operatively carried on a hinge pin 14 operatively connected to the main frame 12. To this end two bushes 51 and 55 are fixedly secured to the mounting plates 21 and 25 to enable rotational or pivotal movement of the plates relative to the hinge pin 14. The two bushes 51 and 55 are operatively connected together through a coupling link 57 which passes through an aperture 58 in centre plate 17 of the tool frame 12. The coupling link 57 is connected to each bush 51 and 55 via flanges 52 and 56. The aperture 58 acts as a pivot point for coupling link 57. The hinge pin 14 is supported at its ends by frame end plates 15 and 16. By arrangement of the coupling pin and its connection to the bushes the two tool support arms (not shown in FIG. 11) which are connected to the mounting plates 21 and 25 are caused to adopt a "walking" action when in use; that is, to say pivotal movement of one arm in one direction causes pivotal movement of the other arm in the other direction. This arrangement ensures that the tools will be in constant contact with the ground notwithstanding any depression or raised portions of the ground surface. The "walking" assembly acts similarly to a vehicle suspension. Furthermore, as shown in FIGS. 8 to 10 the mounting plates 21 and 25 can be moved towards or away from one another in the axial direction of the mounting pins so that the tools 24 and 26 can be selectively positioned relative to one another.

Figure 1:
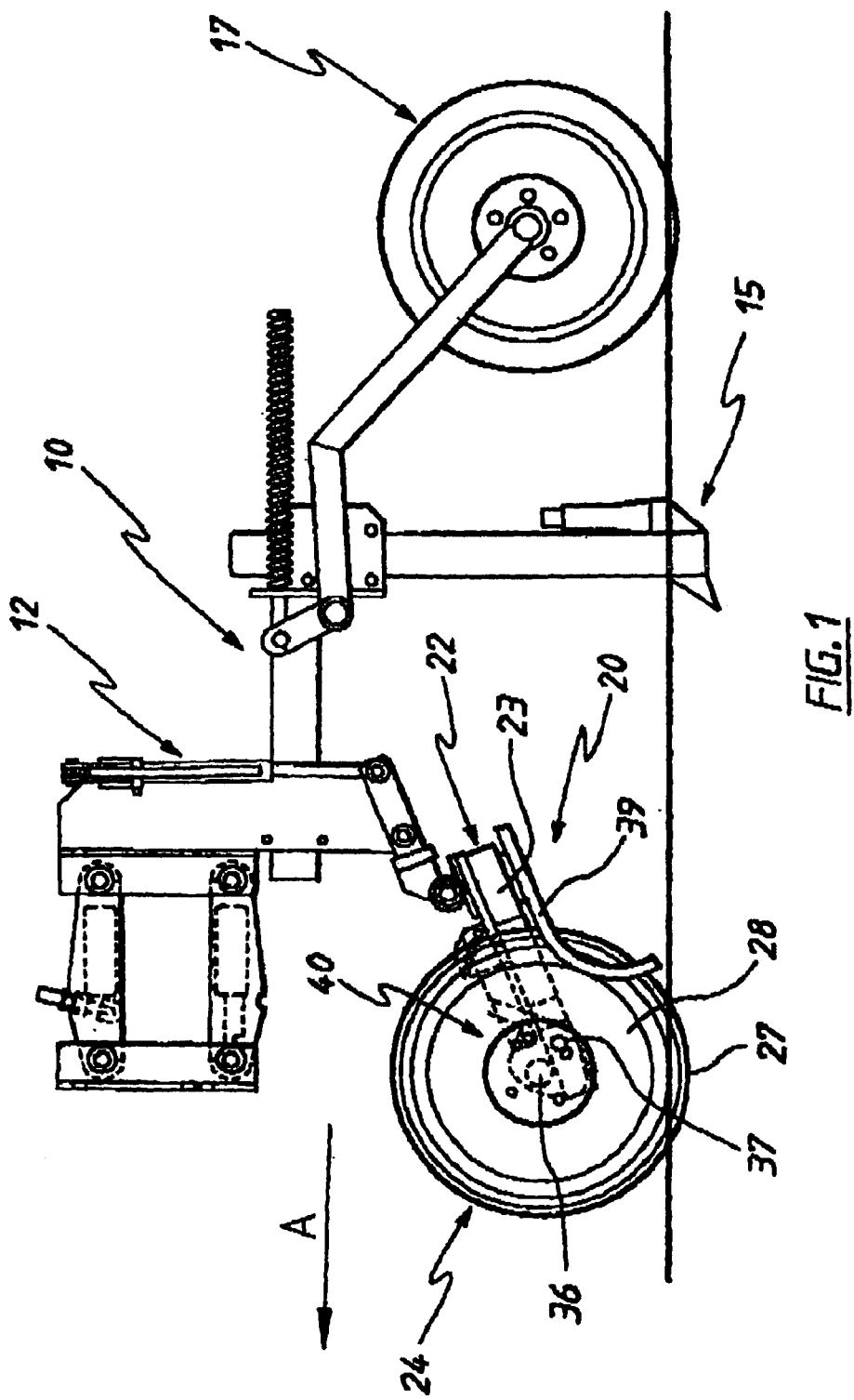
FIG. 1 is a schematic side elevation of agricultural apparatus according to a preferred embodiment of the present invention.
Figure 2:
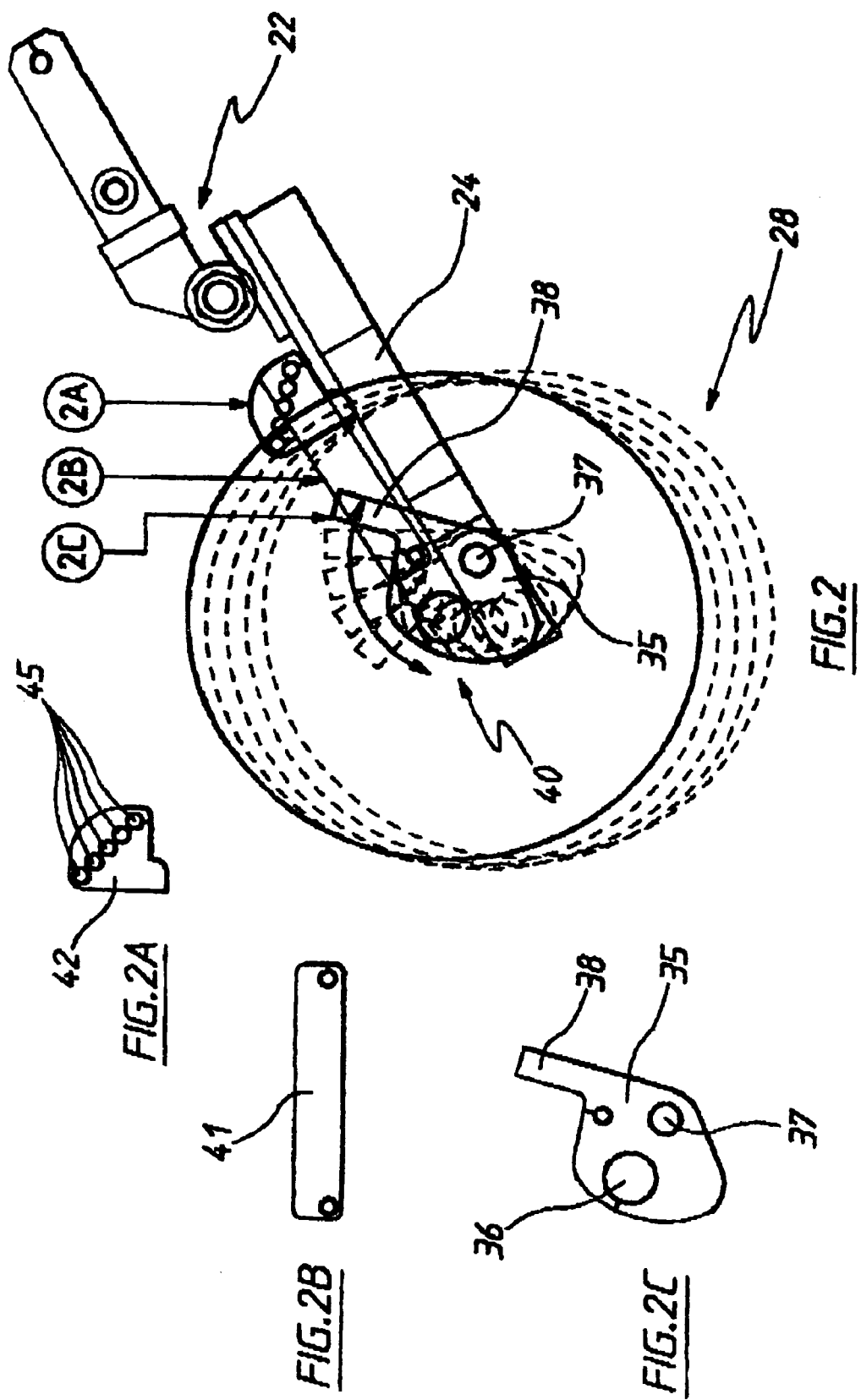
FIG. 2 is a schematic detail of the furrow forming tool as shown in FIG. 1.

Each of the tools 24 and 26 includes a furrow forming disc 27 and an associated ground engaging wheel 28. As best seen in FIG. 3, the disc and its associated wheel converge towards one another both being inclined with respect to the normal line of travel of the apparatus with the leading edge 29 of the disc 27 extending forwardly of the leading edge of the wheel 28. Furthermore, the disc is mounted relative to the wheel so that it extends below the wheel so that it in use it extends into the ground such that it can form a furrow. The tool frame may have mounted thereto a seeding tube or fertiliser delivery tube 39 as shown in FIG. 1. The disc 27 is mounted to a disc mounting member 30 in the form of a hub 31 which is operatively connected to the tool frame arm 23. The wheel 28 is operatively connected to a wheel mounting member 34 in the form of a stub axle 36 operatively connected to the frame by means of plate 35.

An adjustment assembly 40 is arranged to enable relative movement between the wheel and the discs so that the depth of the furrow can be adjusted. The adjustment assembly includes a plate 35 to which the stub axle 36 is mounted. The plate 35 is pivotally mounted via pivot mounting 37 to the arm 23 so that the plate can pivot thereabout. The stub axle 36 is spaced from the pivot mounting 37 so that pivotal movement of the plate about the pivot mounting 37 will cause the stub axle to move relative to the disc mounting hub 31. A handle 38 is provided to move the plate 35 about the pivot mounting 37. The adjustment assembly further includes an adjustment link 41 operatively connectable between the plate 35 and a link mounting 42 on the arm 23. The link mounting 42 has a series of link mounting positions 45 thereon so that the plate 35 can be held in a selected position.

In operation the disc 27 is set at a selected height below the wheel 28 with which it is associated. This is done by disconnecting link 41 from the link mounting 42. The link 41 can be connected to a selected mounting position 45 on the link mounting 42 by means of a fastener such as a bolt or the like (not shown). Once the link is released the plate 35 can be moved about pivot mounting 37 by moving the handle 38. The pivotal movement causes the axle 37 and thereby the wheel 28 relative to the disc 27 with which it is associated thereby raising or lowering the disc relative to the wheel so that the depth of the furrow to be formed can be determined. Once in the selected position the like 41 is reconnected to the appropriated link mounting position 45 on the link mounting 42.

As best seen in FIG. 3 the arms 23 of the unit 20 are pivotally mounted so that they can move relatively to one another.

The agricultural apparatus 10 further includes a furrow filling tool 15 which in the form shown comprises a tine double disc or the like which is disposed relative to the tool unit so that it is between the tools carried by the unit with respect to the line of travel of the apparatus. The apparatus further includes rearwardly disposed compacting wheels 17 which compact the earth after the furrows have been filled. Such compacting wheels are conventional.

Finally, it is to be understood that various alterations, modifications and/or additions may be incorporated into the various constructions and arrangements of parts without departing from the spirit or ambit of the invention.

We claim:

1. A furrow forming tool for use in agricultural apparatus the tool including a tool frame, a furrow forming disc operatively mounted to the tool frame, the disc including a peripheral edge and opposed side faces, the disc being operatively mounted to the tool frame such that when in use the disc is disposed in a plane which is inclined with respect to the normal direction of travel of the tool such that one side face is facing generally forwardly and the other side face is facing generally rearwardly with respect to the direction of travel, the tool further including a ground engaging wheel associated therewith, the disc and its associated ground engaging wheel being assembled together so that they converge towards one another with respect to the normal direction of travel of the tool when in use, the disc being mounted relative to the wheel so that its leading edge is disposed forwardly of the leading edge of the ground engaging wheel with the ground engaging wheel disposed adjacent to the rearwardly facing side face of the disc.

2. A furrow forming tool according to claim 1 wherein the tool is operatively mounted to a tool frame which is adapted to be mounted to a main frame of the apparatus when in use.

3. A furrow forming tool according to claim 2 wherein the tool frame includes a disc mounting member and a wheel mounting member each operatively connected to the tool frame.

4. A furrow forming tool according claim 1 wherein the tool frame includes a support plate pivotally mounted to a main frame for pivotal movement relative thereto and a tool support arm operatively connected to the support plate, said wheel and disc being mounted to said tool support arm and disposed forwardly of the support plate so as to be spaced from the pivot mounting.

5. A furrow forming tool according to claim 4 further including an adjustment assembly which includes said plate, an adjustment link and a link mounting, the link extending between the plate and the link mounting, the link mounting including a plurality of mounting positions for selectively holding the link so that the position of the wheel relative to the disc can be held in a selected position.

6. A furrow forming tool unit for use in agricultural apparatus, the tool unit including a tool frame which is adapted to support two or more furrow forming tools according claim 1 in spaced apart relation relative to one another, the tool unit being arranged on the agricultural apparatus so that a furrow filling tool is disposed rearwardly and between adjacent tools on the unit so that it is adapted to fill both furrows.

7. A furrow forming tool unit according to claim 6 including a main frame to which the furrow forming tools are operatively connected and may further include compacting means arranged to compact the ground after the furrow has been filled.

8. A furrow forming tool unit according to claim 6 wherein said tools are mounted for adjustment relative to the frame so that they can be moved towards or away from one another.

9. A furrow forming tool according to claim 4 wherein said rotation axes of said associated wheel and discs are disposed generally side-by-side and inclined relative to one another.

* * * * *